United States Patent [19]
Suzuki et al.

[11] 3,715,279
[45] Feb. 6, 1973

[54] RECOVERY OF PROTEASE VALUES FROM FERMENTATION BROTHS

[75] Inventors: Hiroyuki Suzuki; Gosaburo Shionoya; Yoshihisa Suzuki, all of Kanagawa; Tsuneo Hirahara, Tokyo, all of Japan

[73] Assignee: Ajinomoto Co., Inc., Tokyo, Japan

[22] Filed: Sept. 25, 1970

[21] Appl. No.: 75,672

Related U.S. Application Data

[63] Continuation-in-part of Ser. No. 35,258, May 6, 1970, abandoned.

[30] Foreign Application Priority Data

May 22, 1969    Japan ................................44/39715

[52] U.S. Cl. ...........................195/68, 252/DIG. 12
[51] Int. Cl. .............................................C07g 7/028
[58] Field of Search............................195/68, 63, 66

[56] References Cited

UNITED STATES PATENTS

| | | | |
|---|---|---|---|
| 3,102,081 | 8/1963 | Faucett et al. | 195/68 |
| 3,573,170 | 3/1971 | Clark et al. | 195/63 |
| 2,922,749 | 1/1960 | Snyder et al. | 195/66 R |
| 3,592,737 | 7/1971 | Keay et al. | 195/66 R |

*Primary Examiner*—Lionel M. Shapiro
*Attorney*—Kelman and Berman

[57] ABSTRACT

Protease values can be recovered from aqueous solutions of the same, including fermentation broths, by precipitation with isopropanol in the presence of sodium or potassium sulfate. The sulfate bearing coprecipitate is granular and directly suitable for use in detergent compositions.

8 Claims, No Drawings

RECOVERY OF PROTEASE VALUES FROM FERMENTATION BROTHS

This application is a continuation-in-part of our copending application Ser. No. 35,258, filed on May 6, 1970, and now abandoned.

This invention relates to the recovery of protease values from aqueous protease solutions, and particularly, though not exclusively, to the recovery of protease values from fermentation broths.

Protease is employed in detergent compositions for laundry use. It may be extracted from animal or plant tissues, but has been produced recently on an industrial scale by fermentation of nutrient media by suitable microorganisms. The recovery of the protease values from the fermentation broths is difficult. It is known that protease and other enzymes can be salted out from their aqueous solutions by means of electrolytes such as ammonium sulfate or sodium chloride, and can also be precipitated from the aqueous phase by the addition of organic solvents which are miscible with water but non-solvents for the enzyme, such as the lower alkanols and alkanones. The precipitates obtained by the known methods are amorphous, gummy masses which are not readily separated from the aqueous medium.

It has therefore been proposed that enzymes be precipitated on solid carriers by means of organic liquids, and the resulting product recovered by filtration (U.S. Pat. No. 2,927,060 and 3,102,081). When these known precipitation methods, which employ starch or edible organic acids as carriers, are applied to protease, the recovered product has only little of its original activity.

We now have found that a solid product which is readily recovered by filtration and drying and retains most of the protease activity of the original aqueous solution can be obtained by adding a small amount of sodium sulfate and/or potassium sulfate to the aqueous solution and by mixing the sulfate bearing solution so obtained with an adequate amount of ispropanol. The recovered precipitate is granular and consists essentially of alkali metal sulfate and protease and may be used for compounding detergent compositions without further treatment.

The precipitate obtained according to the method of this invention is so readily filtered that other recovery methods are not more advantageous, and decantation or centrifuging is not necessary though entirely possible.

As will be shown in more detail hereinbelow, the formation of a readily filtered precipitate which retains practically the entire protease activity originally present in the solution, is available only when the precipitating agent is isopropanol, and when sodium sulfate, potassium sulfate, or both are present in the solution for coprecipitation.

The method has its greatest economic value in the recovery of protease values from complex aqueous systems such as the fermentation broths obtained by culturing microorganisms capable of producing extracellular protease in the broths, cell-free filtrates of such broths, protease-bearing extracts of microbial cells, extracts of animal or vegetal tissues, and mixtures of such protease sources. The specific nature of the protease does not affect the success of the method, and alkaline, acid, and neutral proteases have been recovered in the manner described.

While the amounts of the reagents employed are not critical, practically the entire protease content of a complex aqueous system such as a fermentation broth can usually be recovered by the addition of about one to five grams alkali metal sulfate to 100 milliliters of the aqueous, protease-bearing liquid. The amount of isopropanol that needs to be added to cause joint precipitation of the alkali metal sulfate and of the protease differs in accordance with specific operating conditions, but two to five volumes of isopropanol added to each volume of the aqueous liquid normally produce the desired precipitation. It is preferred to perform the precipitation at low temperatures for highest protease yields, temperatures of less than 10°C. being most suitable, and temperatures between 0° and 5°C. giving consistently high yields without requiring complex refrigeration arrangements.

The unique effects of sodium sulfate and potassium sulfate are evident from the following table which shows the results of test runs on protease-bearing culture broth of Bacillus subtilis FERMP–242.

The cells were removed from the broth by filtration with filter aid (Celite), the addition agents listed in the table were dissolved in respective 50 ml batches of the cell free filtrate, the solutions so obtained were cooled in an ice bath, and were thereafter each mixed with 100 ml isopropanol. The precipitates formed were filtered off, dried in a vacuum, and weighed if possible. The protease activity (P.A.) was determined in each dry product and in the mother liquor by Anson's method, and is listed in Table 1 in percent of the protease activity found in the corresponding amount of cell free broth. Where the weight of the precipitate is not listed in Table 1, the precipitate was difficult to filter and could not be separated from the filter paper.

TABLE 1

| Addition Agent | Precipitate g | % P.A. | Liquor, % P.A. |
|---|---|---|---|
| $Na_2SO_4$ 0.5 g | 0.8 g | 74.1 | 0.1 |
| $CaSO_4$ 1.0 | 1.26 | 38.3 | 7.4 |
| $Na_2SO_3$ 1.0 | 1.20 | 40.8 | 9.7 |
| KCl 3.0 | | 27.4 | 1.21 |
| $NH_4Cl$ 9.0 | | 18.2 | 12.7 |
| $Na_2CO_3$ 4.0 | 4.3 | 30.5 | 5.9 |
| $NaHCO_3$ 1.0 | | | 0.5 |
| $K_2SO_4$ 1.0 | 1.18 | 62.3 | 0.1 |
| Starch 1.0 | 1.02 | 36.5 | 0.7 |
| Na-succinate 1.0 | | 33.1 | 12.7 |
| None | | 35.7 | 1.3 |

As is evident from the Table, coprecipitation of the protease with sodium or potassium sulfate removes practically the entire protease values from the aqueous phase, and more than 60 percent of the original protease activity is maintained in the dry recovered product. All other addition agents tested left significant amounts of protease in the liquor and/or caused deactivation of protease so that only 40 percent or less of the protease values originally present could be recovered.

The use of isopropanol as the precipitating agent is as important as the use of the alkali metal sulfates, and comparable results cannot be achieved with other common, water-soluble, organic solvents, as is evident from Table 2.

The protease activities indicated in Table 2 were determined by filtering a culture broth of Bacillus substilis FERMP-242, and dissolving 2.0 g Na$_2$SO$_4$·10H$_2$O in each of several 200 ml batches of the filtered broth. Four hundred ml of the solvents listed in Table 2 were added dropwise to respective batches in an ice bath, and the precipitates formed were filtered off, dried in a vacuum and tested for protease activity by Anson's method. The results shown in Table 2 in percent of protease activity of the cell free broth demonstrate the superiority of isopropanol as a precipitating agent over the other tested solvents.

TABLE 2

| Solvent | P.A. in Dry Precipitate, % |
|---|---|
| Isopropanol | 97.2 |
| Acetone | 67.9 |
| Ethanol | 55 |
| Methanol | 49 |

The following Examples are further illustrative of the invention, but it will be understood that the invention is not limited thereto.

EXAMPLE 1

A culture broth of Bacillus subtilis FERMP-242, a micro-organism which produces alkaline protease, was filtered with hydrated amorphous silica (Celite) as a filter aid to remove the bacterial cells. The filtrate contained 760 units protease per ml, and 1.0 g Na$_2$SO$_4$·10 H$_2$O was dissolved in 100 ml of the filtrate. The solution was cooled in an ice bath, and 200 ml isopropanol were added gradually. The precipitate was readily recovered by filtration on a Buchner funnel, and dried in a vacuum.

The product weighed 1.66 g and had a protease activity of 44,500 units per gram corresponding to a protease yield of 97.2 percent. In addition to the protease, the precipitate consisted mainly of crystalline sodium sulfate.

Protease activity referred to in this example and hereinbelow was measured by Anson's method.

EXAMPLE 2

A culture broth of *Bacillus subtilis* NRRLB-3700 was filtered. The filtrate had a protease activity of 2,200 units per ml. 4.7 g Sodium sulfate dekahydrate were dissolved in 470 ml of the filtrate, and a coprecipitate of protease and sodium sulfate was formed upon the addition of 1.46 liters 88 percent (vol.) aqueous isopropanol. The precipitated material was recovered as described in Example 1.

It weighed 4.5 g and contained 189,000 units protease per gram corresponding to a protease recovery of 82.4 percent.

EXAMPLE 3

One hundred ml of a filtered culture broth of *Bacillus subtilis* containing 1270 units alkaline protease per milliliter were mixed with 2.5 g sodium sulfate dekahydrate and 2.5 g potassium sulfate. A coprecipitate of the alkali metal sulfates and of the protease was formed by the further addition of 200 ml isopropanol, and the precipitate was recovered as in Example 1.

It weighed 2.83 g and included 33,500 protease units per gram, corresponding to a protease yield of 76 percent.

EXAMPLE 4

1.0 g Potassium sulfate was dissolved in 100 ml cell-free broth obtained by filtering a culture of *Bacillus subtilis*, the sulfate-bearing solution was cooled in an ice bath, and protease was precipitated together with potassium sulfate by adding 200 ml isopropanol. The precipitate was filtered off and dried. It weighed 1.5 g and had a protease activity of 149,500 units per gram, corresponding to a protease recovery of 76.6 percent from the cell-free broth.

What is claimed is:

1. A method of recovering protease values from an aqueous culture broth obtained by culturing a microorganism capable of producing protease, said protease values being dissolved in said broth, which method comprises:

a. dissolving in said broth an alkali metal sulfate selected from the group consisting of sodium sulfate, potassium sulfate, and a mixture of said sodium and potassium sulfate;

b. adding to the sulfate-bearing broth so obtained an amount of isopropanol sufficient to precipitate therefrom a solid product essentially consisting of protease and of said alkali metal sulfate; and c. recovering said product.

2. A method as set forth in claim 1, wherein the amount of said alkali metal sulfate is approximately 1 to 5 grams per 100 milliliter of said aqueous broth.

3. A method as set forth in claim 2, wherein the volume of the added isopropanol is approximately two to five times the volume of said sulfate-bearing broth.

4. A method as set forth in claim 3, wherein said isopropanol is added to said sulfate-bearing broth at a temperature of less than 10°C.

5. A method as set forth in claim 4, wherein said temperature is between 0°C. and 5°C.

6. A method as set forth in claim 1, wherein said broth is cell free.

7. A method as set forth in claim 1, wherein said protease is alkaline protease.

8. A method as set forth in claim 1, wherein said product is recovered by filtering said broth containing the precipitated product.

* * * * *